US008384701B2

(12) United States Patent
Kang et al.

(10) Patent No.: US 8,384,701 B2
(45) Date of Patent: Feb. 26, 2013

(54) ORGANIC LIGHT EMITTING DISPLAY APPARATUS AND METHOD OF DRIVING THE SAME

(75) Inventors: Ki-Nyeng Kang, Yongin (KR); Jae-Kyeong Jeong, Yongin (KR)

(73) Assignee: Samsung Display Co., Ltd., Guheung-Gu, Yongin-City, Gyeonggi-Do (KR)

( * ) Notice: Subject to any disclaimer, the term of this patent is extended or adjusted under 35 U.S.C. 154(b) by 999 days.

(21) Appl. No.: 12/385,307

(22) Filed: Apr. 3, 2009

(65) Prior Publication Data

US 2009/0251452 A1 Oct. 8, 2009

(30) Foreign Application Priority Data

Apr. 4, 2008 (KR) ........................ 10-2008-0031705

(51) Int. Cl.
*G09G 3/32* (2006.01)
*G06F 3/038* (2006.01)

(52) U.S. Cl. ............................. 345/211; 345/76; 345/82

(58) Field of Classification Search ........................ None
See application file for complete search history.

(56) References Cited

U.S. PATENT DOCUMENTS 7,612,747 B2 * 11/2009 Huang et al. .................... 345/76
7,876,296 B2 * 1/2011 Jang et al. ....................... 345/82
2003/0103022 A1 * 6/2003 Noguchi et al. ................ 345/77
2003/0112208 A1 * 6/2003 Okabe et al. ..................... 345/82
2004/0012545 A1 * 1/2004 Li ................................... 345/55
2004/0207614 A1 * 10/2004 Yamashita et al. ............ 345/211
2005/0007318 A1 * 1/2005 Kasai et al. ...................... 345/76
2005/0017934 A1 * 1/2005 Chung et al. .................... 345/82
2006/0038762 A1 * 2/2006 Chou .............................. 345/92
2007/0268220 A1 * 11/2007 Lee et al. ........................ 345/76
2009/0251452 A1 * 10/2009 Kang et al. .................... 345/211

FOREIGN PATENT DOCUMENTS

KR 1020030035195 A 5/2003
KR 1020070025760 A 3/2007

OTHER PUBLICATIONS

Machine Translation of Hyeon et al., Korean Application No. 10-2005-0082264, published Mar. 8, 2007.*
Korean Office action issued on Jun. 23, 2009 in the corresponding Korean patent application No. 2008-0031705.

* cited by examiner

*Primary Examiner* — Peter Vincent Agustin
(74) *Attorney, Agent, or Firm* — Robert E. Bushnell, Esq.

(57) ABSTRACT

An organic light emitting display apparatus capable of preventing degradation of a driving transistor includes a third transistor in the pixel circuit with the third transistor removing a voltage stress applied to a gate electrode of the driving transistor by applying a ground voltage to the gate electrode of the first transistor according to a second scan signal. The third transistor is different from the driving transistor and the switching transistor. A method of driving the organic light emitting display apparatus is also provided.

15 Claims, 5 Drawing Sheets

ORGANIC LIGHT EMITTING DISPLAY APPARATUS AND METHOD OF DRIVING THE SAME

CLAIM OF PRIORITY

This application makes reference to, incorporates the same herein, and claims all benefits accruing under 35 U.S.C. §119 from an application for ORGANIC LIGHT EMITTING DISPLAY APPARATUS AND METHOD OF DRIVING THE SAME earlier filed in the Korean Intellectual Property Office on 4 Apr. 2008 and there duly assigned Ser. No. 10-2008-0031705.

BACKGROUND OF THE INVENTION

1. Field of the Invention

The present invention relates to an organic light emitting display apparatus and a method of driving the same, and more particularly, to an organic light emitting display apparatus that preserves a threshold voltage of a driving transistor and a method for driving the organic light emitting display apparatus.

2. Description of the Related Art

Generally, organic light emitting display apparatuses, which electrically excite a fluorescent organic compound and emit light, drive a plurality of organic light-emitting cells arranged in a matrix by using an electrical voltage or an electrical current so as to display variable visual images, such as moving images corresponding to a video signals. Such organic light-emitting cells have diode characteristics and thus are referred to as organic light-emitting diodes (OLEDs).

A contemporary organic light emitting diode (OLED) includes an anode, an organic thin film, and a cathode layer. The organic thin film includes a hole injection layer, a hole transport layer, an emission layer, an electron transport layer, and an electron injection layer in order to provide a good balance between electrons and holes and thus improve the luminous efficiency of the OLED.

Methods for driving this organic light emitting diode (OLED) are classified into a passive matrix method, and an active matrix method that uses thin film transistors (TFTs) or MOSFETs. In a passive matrix method, anodes and cathodes are arranged to intersect with each other, and lines are selected so as to drive pixels. On the other hand, in an active matrix method, a TFT is electrically connected to each ITO pixel electrode, and pixels are driven by voltages preserved by the capacitances of capacitors connected to gates of the TFTs. Active matrix methods are divided into a voltage programming method and a current programming method according to the type of signal applied in order to program and preserve a voltage stored by a capacitor.

A contemporary organic light emitting display apparatus includes an organic light emitting diode OLED, two transistors and a capacitor. TFTs are generally used as a switching transistor and a driving transistor.

When a positive or negative voltage is continuously applied to the gate electrode of the driving transistor, the threshold voltage of the driving transistor is shifted due to the phenomenon of voltage stress. Accordingly, when a general 2-transistor 1-capacitor (2T-1C) circuit is used, degradation of the driving transistor may occur, and several hours after the degradation, the threshold voltage of the driving transistor may be shifted, and thus the brightness of the OLED apparatus is altered and becomes different from the initial brightness of the OLED apparatus. Therefore, this shift of the threshold voltage of the driving transistor needs to be prevented.

SUMMARY OF THE INVENTION

It is therefore, an object of the present invention to provide an organic light emitting display apparatus that prevents the degradation of a driving transistor included in each of a plurality of pixel circuits, and a method of driving the organic light emitting display apparatus. It is another object to improve degradation of a driving transistor of the pixel circuits.

According to an aspect of the present invention, an organic light emitting display apparatus includes an organic light emitting diode generating light; a first transistor including a first electrode to which a power supply voltage is applied, a second electrode electrically connected to the organic light emitting diode, and a gate electrode. A second transistor has a first electrode to which a data signal is applied, a second electrode electrically connected to the gate electrode of the first transistor, and a gate electrode to which a first scan signal is applied. A capacitor includes a first terminal electrically connected to the gate electrode of the first transistor and a second terminal electrically connected to the first electrode of the first transistor. A third transistor includes a first electrode electrically connected to the gate electrode of the first transistor, a second electrode to which a ground voltage is applied, and a gate electrode to which a second scan signal is applied, with the second scan signal being a scan signal which is applied to a pixel that is adjacent to a pixel to which the first scan signal is applied, immediately before the first scan signal is applied.

The organic light emitting display apparatus may further include a pixel area having a pixel circuit; and a non-pixel area which is located outside the pixel area and includes a driving circuit for driving the pixel circuit.

The third transistor maybe included in the pixel area or alternatively in the non-pixel area.

When the third transistor is included in the pixel area, the organic light emitting display apparatus may be a front emission type.

When the third transistor is included in the non-pixel area, the non-pixel area may include a plurality of scan lines through which the first scan signal and the second scan signal are transmitted; a scan driving unit supplying the first scan signal and the second scan signal to the plurality of scan lines; a plurality of data lines through which the data signal is transmitted; and a data driving unit supplying the data signal to the plurality of data lines.

The third transistor may be included between the scan driving unit and the pixel area.

The first through third transistors may be NMOS transistors.

The first through third transistors may be oxide thin film transistors (TFTs).

According to another aspect of the present invention, in a method of driving an organic light emitting display apparatus, the method includes receiving a first scan signal and a data signal, and charging a capacitor with a charge voltage corresponding to the data signal; making an organic light emitting diode emit light by application of the charge voltage to an organic light emitting diode; and discharging electric charges remaining in the capacitor according to the second scan signal.

The second scan signal may be a scan signal which is applied to a pixel adjacent to a pixel to which the first scan signal is applied, immediately before the first scan signal is applied.

In the step of discharging electric charges remaining in the capacitor according to the second scan signal, the capacitor may be grounded in response to the second scan signal.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicated the same or similar components, wherein.

DETAILED DESCRIPTION OF THE INVENTION

Figure 1:
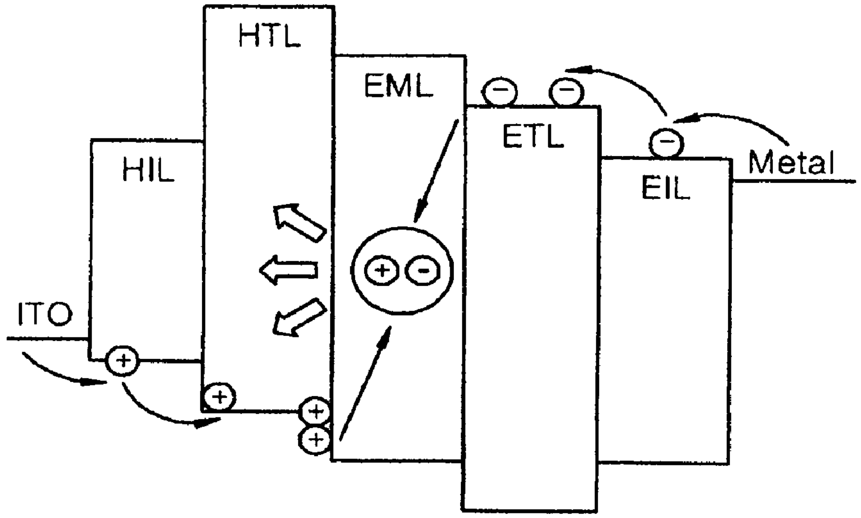
FIG. 1 is a conceptual diagram of an organic light emitting diode.

FIG. 1 is a conceptual diagram of an organic light emitting diode. Referring to FIG. 1, the organic light emitting diode includes an anode (i.e., indium tin oxide (ITO)), an organic thin film, and a cathode layer (i.e., metal). The organic thin film includes a hole injection layer (HIL), a hole transport layer (HTL), an emission layer (EML), an electron transport layer (ETL), and an electron injection layer (EIL) in order to provide a good balance between electrons and holes and thus improves luminous efficiency. The electrons transferred from the metal layer sequentially passing through EIL and ETL and the holes transferred from the ITO layer sequentially passing through HIL and HTL are combined at EML, and lights are generated and emitted at EML due to the combination of the electrons and the holes.

Methods of driving this organic light emitting diode are classified into a passive matrix method, and an active matrix method that uses thin film transistors (TFTS) or MOSFETs. In a passive matrix method, anodes and cathodes are arranged to intersect with each other, and lines are selected so as to drive pixels. On the other hand, in an active matrix method, a TFT is electrically connected to each ITO pixel electrode, and pixels are driven by voltages preserved by the capacitances of capacitors electrically connected to gates of the TFTs. Active matrix methods are divided into a voltage programming method and a current programming method according to the type of signal applied, in order to program and preserve a voltage into a capacitor.

Figure 2:
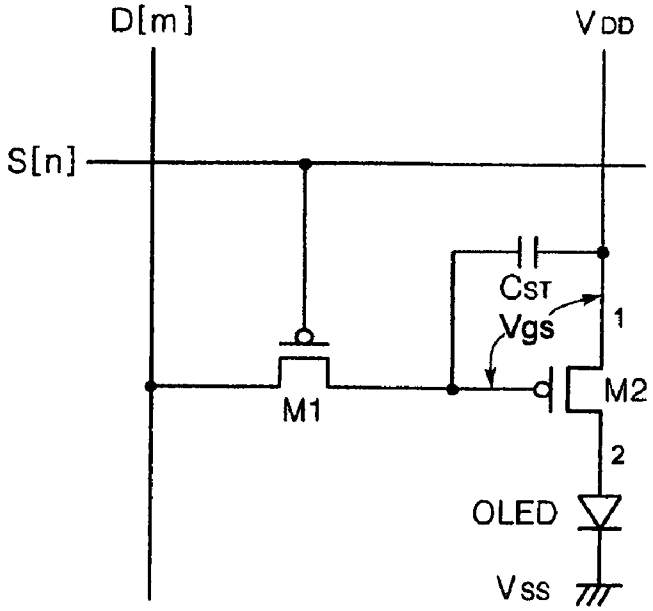
FIG. 2 (PRIOR ART)
FIG. 2 is a circuit schematic diagram of a pixel used in a contemporary organic light emitting display apparatus.

FIG. 2 is a circuit diagram of a pixel used in a contemporary organic light emitting display apparatus. Referring to FIG. 2, the pixel of the contemporary organic light emitting display apparatus includes an organic light emitting diode OLED, two transistors M1 and M2, and a capacitor Cst. TFTs are generally used as switching transistor M1 and the driving transistor M2.

In the circuit diagram of the pixel of FIG. 2, a first electrode of switching transistor M1 is electrically connected to a data signal line. At this time, the switching transistor M1 is turned on by a scan signal S[n] applied to a gate electrode of the switching transistor M1, and thus a data signal D[m] is applied to the pixel.

The capacitor Cst is connected between a first electrode and a gate electrode of the driving transistor M2 and thus, preserves a data voltage corresponding to the data signal D[m] for a predetermined period of time. The driving transistor M2 supplies a current corresponding to a voltage between both terminals of the capacitor Cst to the organic light emitting diode OLED.

When the switching transistor M1 is turned on, a charge corresponding to the data voltage which is applied via the data signal line, is stored in the capacitor. Even when the switching transistor M1 is turned off, a current corresponding to the data voltage is applied to the organic light emitting diode OLED via the driving transistor M2. Accordingly, even when the switching transistor M1 is turned off, the organic light emitting diode OLED continues emitting light for a predetermined period of time.

A current flowing in the organic light emitting diode OLED may be calculated using Equation (1):

$$I_{OLED} = \frac{\beta}{2}(V_{gs} - V_{th})^2 = \frac{\beta}{2}(V_{DD} - V_{data} - |V_{th}|)^2 \tag{1}$$

wherein $I_{OLED}$ denotes a current flowing in the organic light emitting diode OLED, $V_{gs}$ denotes a voltage between the gate electrode and first electrode of the driving transistor M2, $V_{th}$ denotes a threshold voltage of the driving transistor M2 across the first terminal and the gate terminal, $V_{DD}$ denotes a power supply, $V_{data}$ denotes a data voltage of data signal D[M], and β denotes a gain factor.

When a positive or negative voltage is continuously applied to the gate electrode of the driving transistor M2, however, the value of threshold voltage $V_{th}$ may be shifted due to voltage stress. Accordingly, when a general 2-transistor 1-capacitor (2T-1C) circuit is used, the degradation of the driving transistor M2 occurs, and several hours after initiation of the degradation, the value of threshold voltage $V_{th}$ is shifted and thus a brightness of the OLED apparatus that is different from an initial brightness of the OLED apparatus may be caused. Therefore, the shifting of the value of threshold voltage $V_{th}$ of the driving transistor M2 needs to be prevented.

The present invention will now be described more fully with reference to the accompanying drawings, in which exemplary embodiments of the invention are shown.

Figure 3:
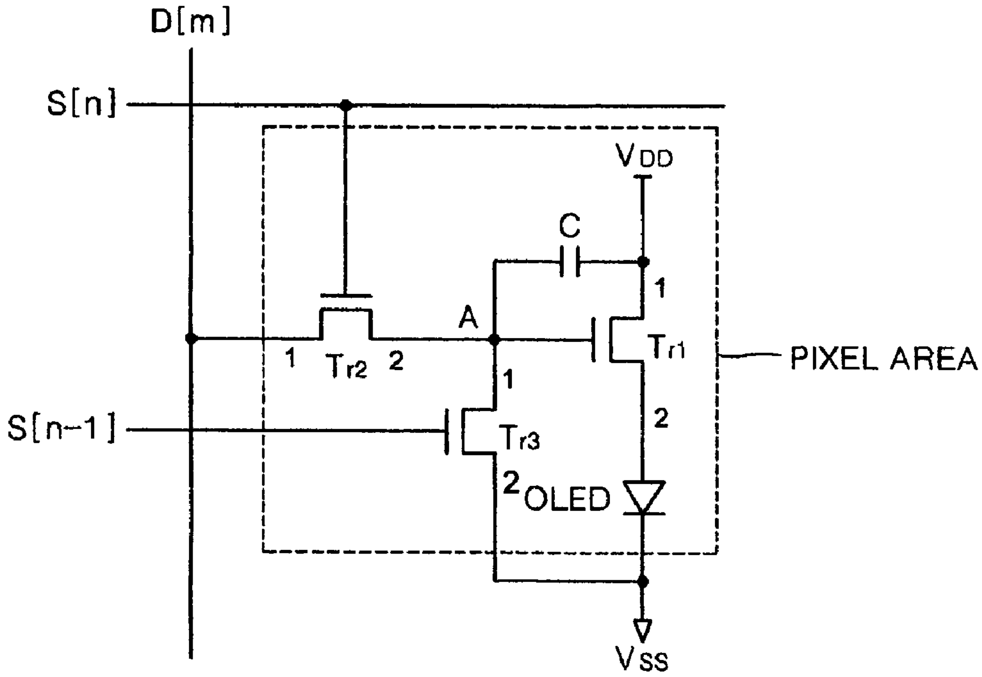
FIG. 3 is a circuit schematic diagram of a pixel used in an organic light emitting display apparatus constructed as an embodiment of the present invention.

FIG. 3 is a circuit diagram of a pixel used in an organic light emitting display apparatus constructed as an embodiment of the present invention. Referring to FIG. 3, the pixel of the organic light emitting display apparatus constructed as the current embodiment includes an organic light emitting diode OLED, a first transistor $Tr_1$, a second transistor $Tr_2$, a capacitor C, and a third transistor $Tr_3$.

The organic light emitting diode OLED receives a current and generates light with the visible band of light wavelengths having any one of red, green, and blue colors. An anode of the organic light emitting diode OLED is electrically connected to a second electrode of the first transistor $Tr_1$. A cathode of the organic light emitting diode OLED receives a ground voltage $V_{SS}$.

A power supply voltage $V_{DD}$ is applied to a first electrode of the first transistor $Tr_1$, and a data signal is applied to a gate electrode of the first transistor $Tr_1$. The second electrode of the first transistor $Tr_1$ is electrically connected to the organic light emitting diode OLED. The first transistor $Tr_1$ is a driving transistor, and applies a current to the organic light emitting diode OLED.

The data signal is applied to a first electrode of the second transistor $Tr_2$, and a first scan signal is applied to a gate electrode of the second transistor $Tr_2$ via a first scan line S[n]. A second electrode of the second transistor $Tr_2$ is electrically connected to the gate electrode of the first transistor $Tr_1$. The first scan line S[n] selects a pixel area on which an image is to be displayed. The first scan signal is applied via the first scan line S[n].

A first terminal of the capacitor C is connected to the gate electrode of the first transistor $Tr_1$, and a second terminal thereof is connected to the first electrode of the first transistor $Tr_1$.

The third transistor $Tr_3$ has a first electrode electrically connected to the gate electrode of the first transistor $Tr_1$, a second electrode to which a ground voltage is applied, and a gate electrode to which a second scan signal is applied via a second scan line S[n-1]. The second scan line S[n-1] is a scan line through which a scan signal for selecting pixel areas existing on a row immediately above the pixel area on which the image is to be displayed is applied. The second scan signal is applied via the second scan line S[n-1].

In other words, the second scan signal is applied immediately before the first scan signal is applied. That is, when scan signals are sequentially applied in a row direction to an organic light emitting display apparatus having a n×m matrix form, if a first scan signal is applied to the circuits of the pixels existing in an n-th row, a second scan signal is applied to the circuits of the pixels existing in an (n-1)th row, which is immediately above the pixels to which the first scan signal is applied. When n is 1, that is, when the pixels existing in the n-th row are the top pixels, the second scan signal may be a scan signal applied to the pixels existing on the bottom row.

In an operation of the pixel circuit according to the current embodiment, since the second transistor $Tr_2$ is turned on by the first scan signal, the data signal is applied to the pixel circuit. The capacitor C preserves a data voltage corresponding to the received data signal for a predetermined period of time. The first transistor $Tr_1$ supplies a current corresponding to a voltage between both terminals of the capacitor C to the organic light emitting diode OLED.

On the other hand, even when the second transistor $Tr_2$ is turned off after a charge corresponding to the data voltage is stored in the capacitor C, a current corresponding to the data voltage is applied to the organic light emitting diode OLED via the first transistor $Tr_1$, and thus the organic light emitting diode OLED continues emitting light for a predetermined period of time. Thus, a positive or negative voltage is continuously applied to the gate electrode of the first transistor $Tr_1$ for a predetermined period of time.

After the first scan signal is applied and thus light is emitted for a predetermined period of time, the second scan signal is applied to the gate electrode of the third transistor $Tr_3$ before the first scan signal corresponding to the next period is applied to the second transistor $Tr_2$. When the third transistor $Tr_3$ is turned on by the second scan signal, the capacitor C is discharged due to the ground voltage $V_{SS}$ being applied to the second electrode of the third transistor $Tr_3$. In other words, all of the charges stored in the capacitor C are discharged and thus the voltage to be applied to the gate electrode of the first transistor $Tr_1$ is removed.

As described above, the second scan signal is applied to the third transistor $Tr_3$ at the moment when light emission of the organic light emitting diode OLED concludes, and thus a voltage stress applied to the gate electrode of the first transistor $Tr_1$ is removed. Therefore, deterioration of the first transistor $Tr_1$, which is a driving transistor, and shifting of a threshold voltage of the first transistor $Tr_1$ are prevented, and thus, an image with a constant brightness can be displayed. Due to the prevention of degradation of the first transistor $Tr_1$, the durability of the pixel circuit can be increased.

A general organic light emitting display apparatus may be divided into a pixel area including pixel circuits and a non-pixel area which is located outside the pixel area and includes a driving circuit for driving the pixel circuits.

In the organic light emitting display apparatus according to the current embodiment, the organic light emitting diode OLED, the first transistor $Tr_1$, the second transistor $Tr_2$, the capacitor C, and the third transistor $Tr_3$ are all included in the pixel area. If a pixel area includes a third transistor $Tr_3$, an organic light emitting display apparatus including the pixel area may be a front emission type. The organic light emitting display apparatus according to the current embodiment is therefore a front emission type. If the pixel circuit of the organic light emitting display apparatus constructed as the current embodiment including one more transistor in the pixel area compared to a general pixel circuit, that is, a 2T-1C pixel circuit, is based on bottom emission, an aperture ratio may be decreased. Therefore, the organic light emitting display apparatus having a front emission structure according to the current embodiment can prevent the decrease in aperture ratio as well as the degradation of the first transistor $Tr_1$.

Figure 4:
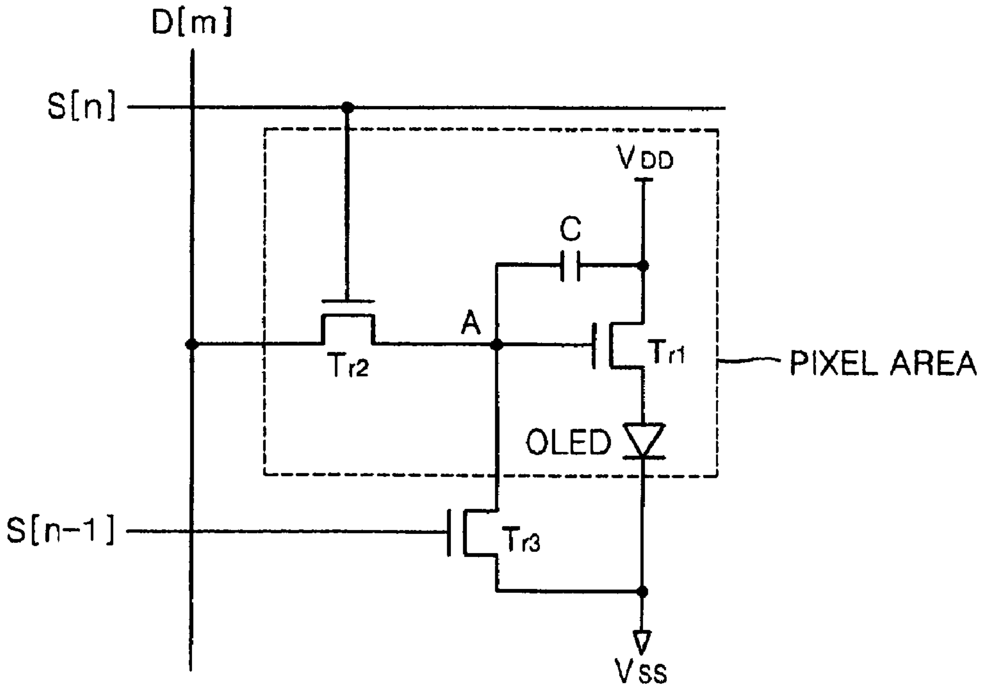
FIG. 4 is a circuit schematic diagram of a pixel used in an organic light emitting display apparatus constructed as another embodiment of the present invention.

FIG. 4 is a circuit diagram of a pixel used in an organic light emitting display apparatus constructed as another embodiment of the present invention. The pixel circuit of the organic light emitting display apparatus of FIG. 4 is the same as that of FIG. 3 in terms of configuration and connection, except that the third transistor Tr3 in FIG. 4 is included in the non-pixel area.

Since the third transistor $Tr_3$ is not included in the pixel area, the organic light emitting display apparatus of FIG. 4 may have an aperture ratio equal to that of a general 2T-1C organic light emitting display apparatus regardless of an emission method such as front emission or bottom emission. Similar to the embodiment as shown in FIG. 3, the degradation of the first transistor $Tr_1$ can be prevented by removing the voltage stress applied to the first transistor $Tr_1$ by using the second scan signal.

Figure 5:
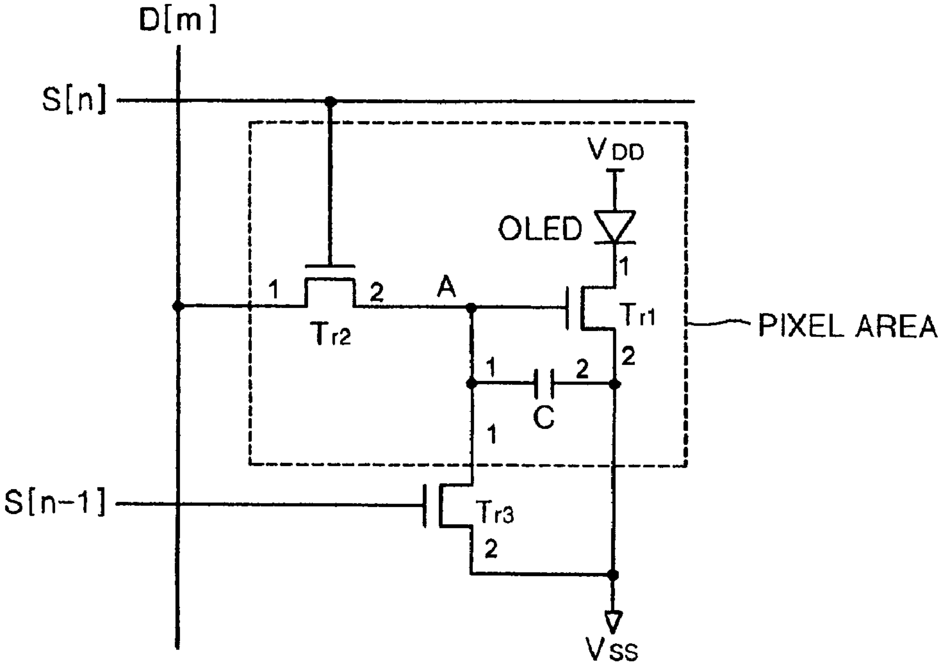
FIG. 5 is a circuit schematic diagram of a pixel used in an organic light emitting display apparatus constructed as still another embodiment of the present invention.

FIG. 5 is a circuit diagram of a pixel used in an organic light emitting display apparatus constructed as another embodiment of the present invention. Referring to FIG. 5, similar to FIGS. 3 and 4, the pixel circuit includes an organic light emitting diode OLED, a first transistor $Tr_1$, a second transistor $Tr_2$, a capacitor C, and a third transistor $Tr_3$.

The organic light emitting diode OLED receives a power supply voltage via its anode. A cathode of the organic light emitting diode OLED is electrically connected to a first electrode of the first transistor $Tr_1$.

A first terminal of the capacitor C is electrically connected to a gate electrode of the first transistor $Tr_1$, and a second terminal of the capacitor C is electrically connected to a second electrode of the first transistor $Tr_1$.

The first transistor $Tr_1$, the second transistor $Tr_2$, and the third transistor $Tr_3$ of the pixel circuit of FIG. 5 are electrically connected in the same manner as that of the pixel circuit of FIG. 3 or 4.

The third transistor $Tr_3$ is outside the pixel area.

Similar to FIG. 4, the organic light emitting display apparatus constructed as the current embodiment prevents the degradation of the first transistor $Tr_1$ by reducing a voltage stress applied to the first transistor $Tr_1$ and increases the lifetime of the pixel circuit. In spite of the fact that the pixel circuit of the organic light emitting display apparatus constructed as the current embodiment includes one more transistor than a general pixel circuit, the pixel circuit may have an aperture ratio equal to that of a contemporary pixel circuit.

In the embodiments of FIGS. 3 through 5, the first transistor $Tr_1$, the second transistor $Tr_2$, and the third transistor $Tr_3$ may be NMOS transistors. When the first transistor $Tr_1$ and the third transistor $Tr_3$ are NMOS transistors, a first scan signal for turning on the first transistor Tr1 and a second scan signal for turning on the third transistor $Tr_3$ are high level signals. A data signal applied to a pixel selected so that the organic light emitting diode OLED can emit light is also a high level signal.

Oxide TFTs may be used as the first transistor $Tr_1$, the second transistor $Tr_2$, and the third transistor $Tr_3$. A process of manufacturing an oxide TFT OLED panel is simpler than a process of manufacturing a contemporary silicon TFT OLED panel, thus greatly lowering manufacturing costs. This is because the deposition of a semiconductor layer on an oxide instead of on silicon leads to a large reduction in equipment investment costs, for example, by enabling a thin film to be immediately deposited at a room temperature by sputtering without having to perform high-temperature deposition such as PE-CVD. In addition, an oxide TFT provides a voltage uniformity, which is a merit of amorphous silicon (a-Si), and high electron mobility, which is a merit of low-temperature polysilicon (LTPS), and is thus desirable in terms of improving the lifetime of an OLED panel and obtaining a high resolution. Here, ZnO may be used as the oxide.

Figure 6:
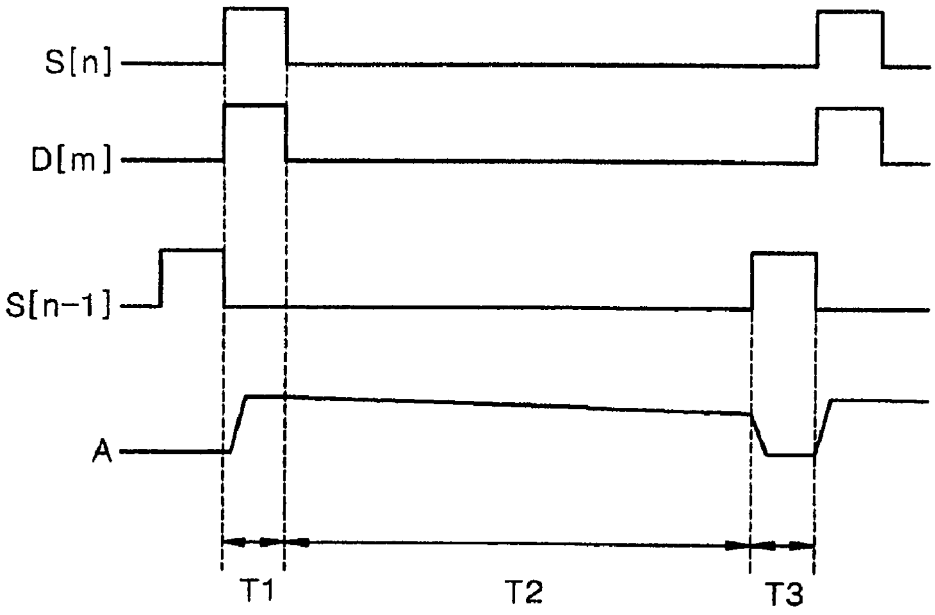
FIG. 6 is a group of waveforms of driving voltages for driving the pixels as illustrated in FIGS. 3 through 5.

FIG. 6 is a group of waveforms of the driving voltages for driving the pixel circuits as illustrated in FIGS. 3 through 5. Referring to FIG. 6, the voltages applied on the first scan line S[n], a data line D[m], the second scan line S[n-1], and the node A may vary.

During a first time period T1, the first scan signal S[n] and the data signal D[m] are applied to a pixel circuit at the same timing, and thus the capacitor C is charged with a data voltage corresponding to the data signal.

During a second time period T2, a current corresponding to the data voltage is applied to the organic light emitting diode OLED by the first transistor $Tr_1$. In response to the current, the organic light emitting diode OLED emits light.

After the organic light emitting diode OLED emits light for a predetermined period of time, during a third time period T3, the second scan signal S[n-1] is applied to the pixel circuit before the first scan signal and the data signal corresponding to the next cycle are applied thereto. According to the second scan signal, charges remaining in the capacitor C are discharged. In other words, when the second scan signal is applied to the pixel circuit, the third transistor $Tr_3$ is turned on, and thus the first and second electrodes of the third transistor $Tr_3$ are electrically connected to each other. Therefore, the ground voltage $V_{SS}$ is applied to the gate electrode of the first transistor Tr1.

The node A is a node electrically connected to the gate electrode of the first transistor Tr1. Seeing a voltage variation of the node A, the voltage of the node A increases up to a voltage corresponding to the data signal during the first time period T1, and slightly decreases during the second time period T2 due to the leakage of current through switching TFTs (Tr2, Tr3). When the second time period T2 is concluded, the ground voltage $V_{SS}$ is applied to the node A during the third time T3, and thus the voltage of the node A decreases to ground voltage $V_{SS}$, i.e., zero. In other words, the voltage stress applied to the gate electrode of the first transistor Tr1 may be removed.

The voltage stress accumulated at the gate electrode of the first transistor Tr1 is removed due to iteration of the first through third times T1 through T3, and thus the degradation of the first transistor Tr1 may be prevented.

Figure 7:
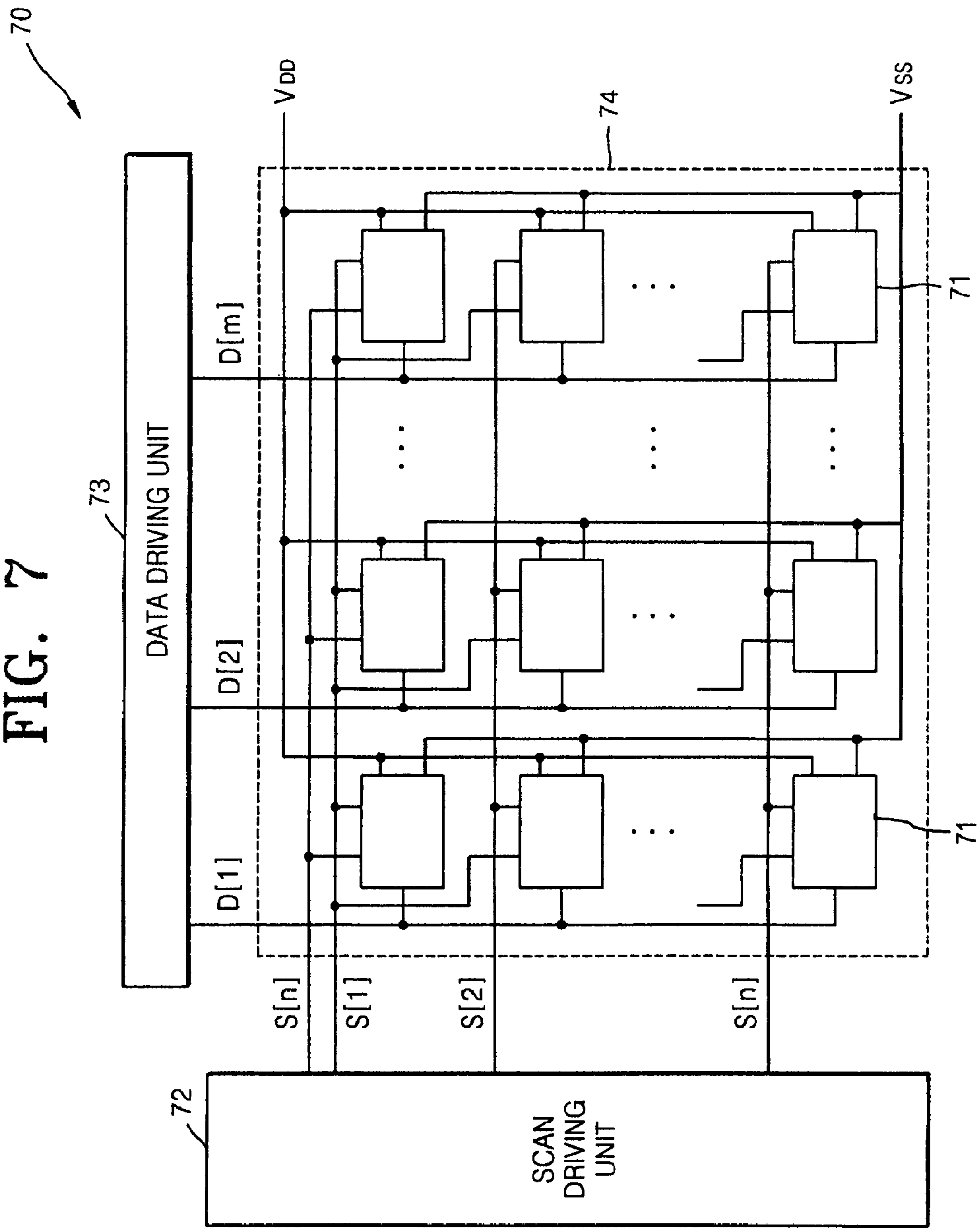
FIG. 7 is a block diagram of the organic light emitting display apparatus including pixel circuits as illustrated in FIG. 3.

FIG. 7 is a block diagram of organic light emitting display apparatus 70 including the pixel circuits illustrated in FIG. 3. Referring to FIG. 7, organic light emitting display apparatus 70 includes scan driving unit 72, data driving unit 73, and image display unit 74.

Image display unit 74 includes n×m pixel areas 71, a number of n scan lines, i.e., S[1] through S[n] arranged in a row direction, a number of m data lines, i.e., D[1] through D[m] arranged in a column direction, a power supply voltage line $V_{DD}$, and a ground voltage line $V_{SS}$.

Each of the pixel areas 71 includes an organic light emitting diode OLED and a pixel circuit. The pixel circuit includes a first transistor, a second transistor, a third transistor, and a capacitor. The scan lines S[1] through S[n] transmit scan signals to pixel areas 71. The data lines D[1] through D[m] and the power supply voltage line $V_{DD}$ transmit data signals and a power supply voltage, respectively, to pixel areas 71.

Scan driving unit 72 applies the scan signals to the scan lines S[1] through S[n]. The scan signals are sequentially applied to the scan lines, and the data signals are applied to the pixel circuits in synchronization with the scan signals.

Data driving unit 73 applies the data signals to the data lines D[1] through D[m]. The data signals may be output from a voltage source (not shown) or a current source (not shown) included in the data driving unit 73.

Scan driving unit 72 and/or data driving unit 73 may be electrically connected to image display unit 74 such as a display panel by wire bonding, for example, or may be mounted in the form of chips on a tape carrier package (TCP), for example, attached to and electrically connected to image display unit 74. Alternatively, scan driving unit 72 and/or data driving unit 73 may be mounted in the form of chips on a flexible printed circuit (FPC), a film, or the like, which is attached to and electrically connected to image display unit 74. This structure is called a chip on film (COF) structure. Alternatively, scan driving unit 72 and/or data driving unit 73 may be directly mounted on a glass substrate of image display unit 74 or may be mounted in a driving circuit formed of layers level with scan lines, data lines, and TFTs, on the glass substrate.

The power supply voltage line $V_{DD}$ and the ground voltage line $V_{SS}$ may be provided to all of pixel areas 71 of image display unit 74 by a common electrode. Alternatively, the power supply voltage line $V_{DD}$ and the ground voltage line $V_{SS}$ may be provided to pixel areas 71 by forming separate wires.

In the n scan lines, i.e., S[1] through S[n] as illustrated in FIG. 7, the scan line S[n], which is uppermost, may be the same as the scan line S[n], which is lowest. Alternatively, the uppermost scan line S[n] may be a new line to which a scan signal equal to a scan signal applied to the lowest scan line S

[n] is applied and which is arranged above the scan line S[1] which applies a scan signal to pixel areas 71 arranged on a first row.

Figure 8:
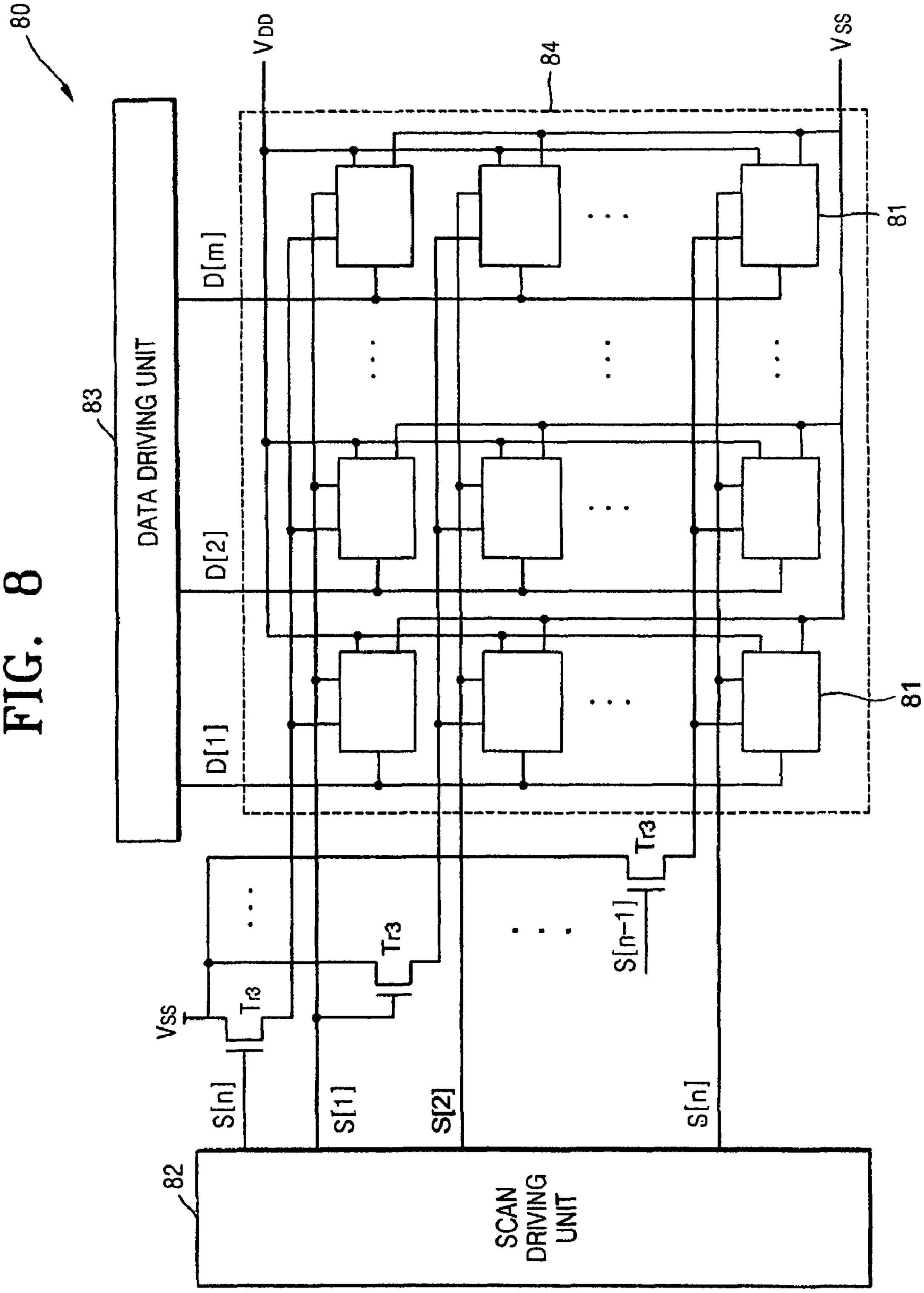
FIG. 8 is a block diagram of the organic light emitting display apparatus including pixel circuits illustrated in FIG. 4.

FIG. 8 is a block diagram of organic light emitting display apparatus 80 including the pixel circuits illustrated in FIG. 4. Referring to FIG. 8, similar to FIG. 7, organic light emitting display apparatus 80 includes scan driving unit 82, data driving unit 83, and image display unit 84.

A plurality of pixel areas 81 included in image display unit 84 respectively do not include the third transistors $Tr_3$. As illustrated in FIG. 8, the third transistors Tr3 may be installed between scan driving unit 82 and pixel areas 81.

When the third transistors $Tr_3$ are included between scan driving unit 82 and pixel areas 81 as illustrated in FIG. 8, the number of transistors may be reduced. When the third transistors $Tr_3$ are included in pixel areas as shown in FIG. 7, each of the pixel areas should include a single third transistor $Tr_3$, and thus a total number of n×m transistors are needed. When a single third transistor $Tr_3$ is shared by pixel areas 81 existing in an identical row to which an identical scan signal is applied as in FIG. 8, however, a total number of n transistors are needed, wherein n corresponds to the number of rows of the pixel areas.

Similar to FIG. 7, a scan line S[n] electrically connected to the third transistor $Tr_3$ on the uppermost location may be the same as a scan line S[n] arranged on the lowermost location. Alternatively, the uppermost scan line S[n] may be different from the lowermost scan line S[n] but the two scan lines S[n] may receive the same scan signal.

As described above, organic light emitting display apparatus 80 may prevent degradation of a first transistor which serves as a driving transistor, and reduce the number of required transistors by including the third transistor $Tr_3$ in a non-pixel area.

As described above, at the moment when emission of light by an organic light emitting diode concludes, a second scan signal is applied to a third transistor so as to remove a voltage stress applied to a gate electrode of a first transistor serving as a driving transistor. Thus, the degradation of the first transistor is prevented, and the shifting of a threshold voltage is prevented, whereby an image continuously presented by a constant brightness may be displayed.

In addition, the lifetime of pixel circuits may be increased due to the prevention of the degradation of the first transistors.

Moreover, by including third transistors in a non-pixel area, a pixel circuit constructed as the present invention may have the same aperture ratio as an aperture ratio of a general pixel circuit regardless of the type of emission method.

Furthermore, the number of required transistors maybe reduced due to the inclusion of the third transistors in the non-pixel area.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An organic light emitting display apparatus, comprising:
an organic light emitting diode generating light;
a first transistor comprising a first electrode to which a power supply voltage may be applied, a second electrode electrically connected to the organic light emitting diode, and a gate electrode;
a second transistor comprising a first electrode to which a data signal may be applied, a second electrode electrically connected to the gate electrode of the first transistor, and a gate electrode to which a first scan signal may be applied;
a capacitor comprising a first terminal electrically connected to the gate electrode of the first transistor and a second terminal electrically connected to the first electrode of the first transistor; and
a third transistor comprising a first electrode electrically connected to the gate electrode of the first transistor, a second electrode electrically connected to a reference voltage is applied, and a gate electrode to which a second scan signal is applied, with the second scan signal being a scan signal which is applied to a pixel adjacent to a pixel to which the first scan signal is applied, immediately before the first scan signal is applied.

2. The organic light emitting display apparatus of claim 1, further comprising:
a pixel area comprising a pixel circuit; and
a non-pixel area which is located outside the pixel area and comprises a driving circuit for driving the pixel circuit.

3. The organic light emitting display apparatus of claim 2, with the third transistor being located within the pixel area.

4. The organic light emitting display apparatus of claim 3, with the organic light emitting display apparatus being a front emission type.

5. The organic light emitting display apparatus of claim 2, with the third transistor being included in the non-pixel area.

6. The organic light emitting display apparatus of claim 5, with the non-pixel area further comprising:
a plurality of scan lines through which the first scan signal and the second scan signal are transmitted;
a scan driving unit supplying the first scan signal and the second scan signal to the plurality of scan lines;
a plurality of data lines through which the data signal is transmitted; and
a data driving unit supplying the data signal to the plurality of data lines.

7. The organic light emitting display apparatus of claim 6, with the third transistor being located between the scan driving unit and the pixel area.

8. The organic light emitting display apparatus of claim 1, with the first, second and third transistors being NMOS transistors.

9. The organic light, emitting display apparatus of claim 8, with the first, second and third transistors being oxide thin film transistors (TFTs).

10. The organic light emitting display apparatus of claim 3, with the non-pixel area further comprising:
a plurality of scan lines through which the first scan signal and the second scan signal are transmitted;
a scan driving unit supplying the first scan signal and the second scan signal to the plurality of scan lines;
a plurality of data lines through which the data signal is transmitted; and
a data driving unit supplying the data signal to the plurality of data lines.

11. A method of driving an organic light emitting display apparatus, the method comprising the steps of:
receiving a first scan signal and a data signal and charging a capacitor with a charge voltage corresponding to the data signal;
making an organic light emitting diode emit light by using the charge voltage; and
discharging electric charges remaining in the capacitor according to a second scan signal.

12. The method of claim 11, in which the second scan signal is a scan signal which is applied to a pixel adjacent to a pixel to which the first scan signal is applied, immediately before the first scan signal is applied.

13. The method of claim 11, in the step of discharging electric charges remaining in the capacitor according to the second scan signal, with the capacitor being grounded according to the second scan signal.

14. An organic light emitting display apparatus, comprising:

an organic light emitting diode generating light;

a first transistor comprising a second electrode electrically connected to a reference voltage, a first electrode electrically connected to the organic light emitting diode, and a gate electrode;

a second transistor comprising a first electrode to which a data signal is applied, a second electrode electrically connected to the gate electrode of the first transistor, and a gate electrode to which a first scan signal is applied;

a capacitor comprising a first terminal electrically connected to the gate electrode of the first transistor and a second terminal electrically connected to the second electrode of the first transistor; and a third transistor comprising a first electrode electrically connected to the gate electrode of the first transistor, a second electrode electrically connected the reference voltage, and a gate electrode to which a second scan signal is applied, with the second scan signal being a scan signal which is applied to a pixel adjacent to a pixel to which the first scan signal is applied, immediately before the first scan signal is applied.

15. The organic light emitting display apparatus of claim 14, with the first and second transistors and the capacitor being located within a pixel area of the organic light emitting display apparatus and with the third transistor being located outside the pixel area.

* * * * *